May 26, 1970     R. E. PAGET, JR     3,513,926
TWO-WHEELED FOLDABLE PERSONNEL TRANSPORTER
Filed Jan. 23, 1968     3 Sheets-Sheet 1
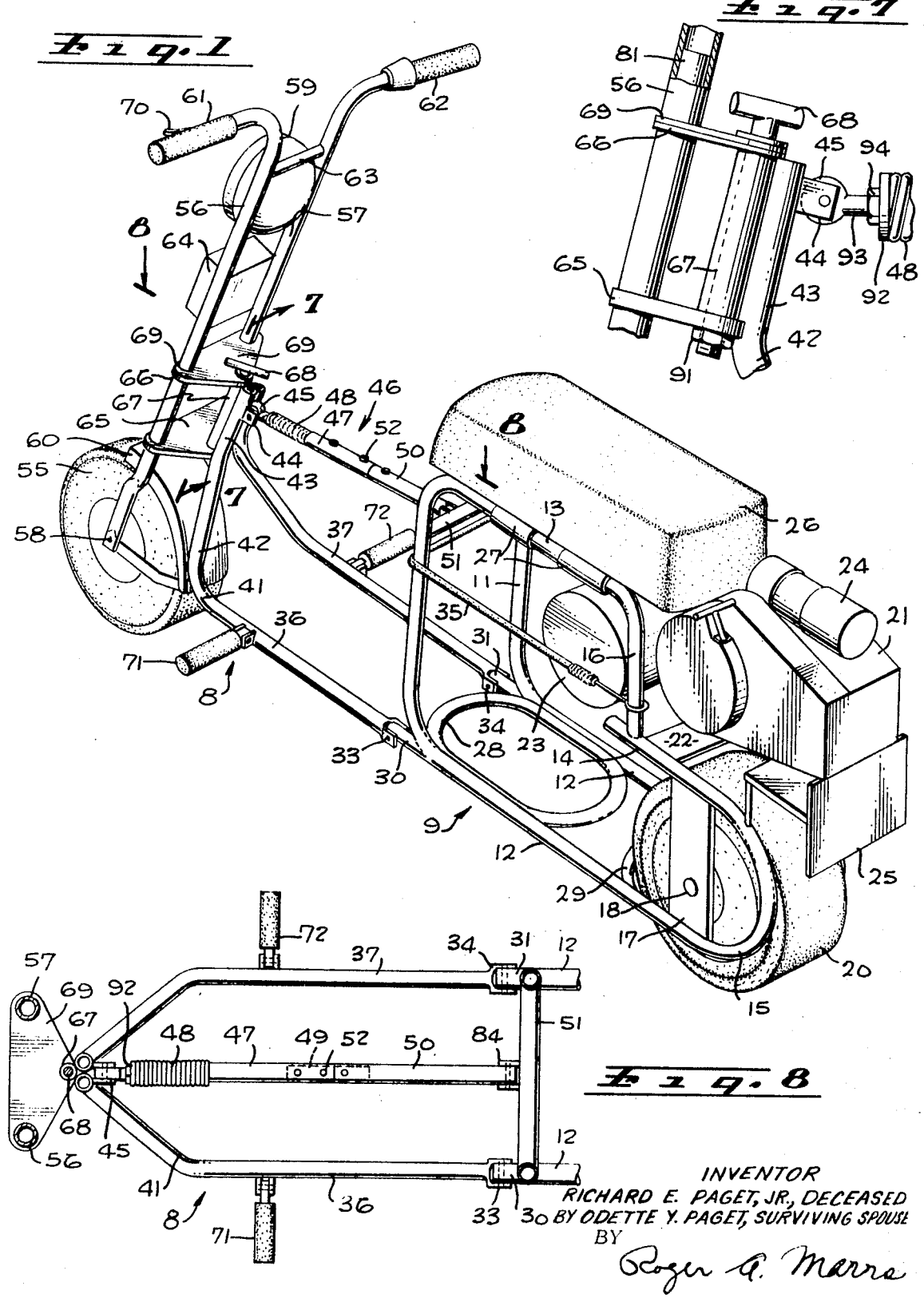
INVENTOR
RICHARD E. PAGET, JR., DECEASED
BY ODETTE Y. PAGET, SURVIVING SPOUSE
BY
Roger A. Marrs

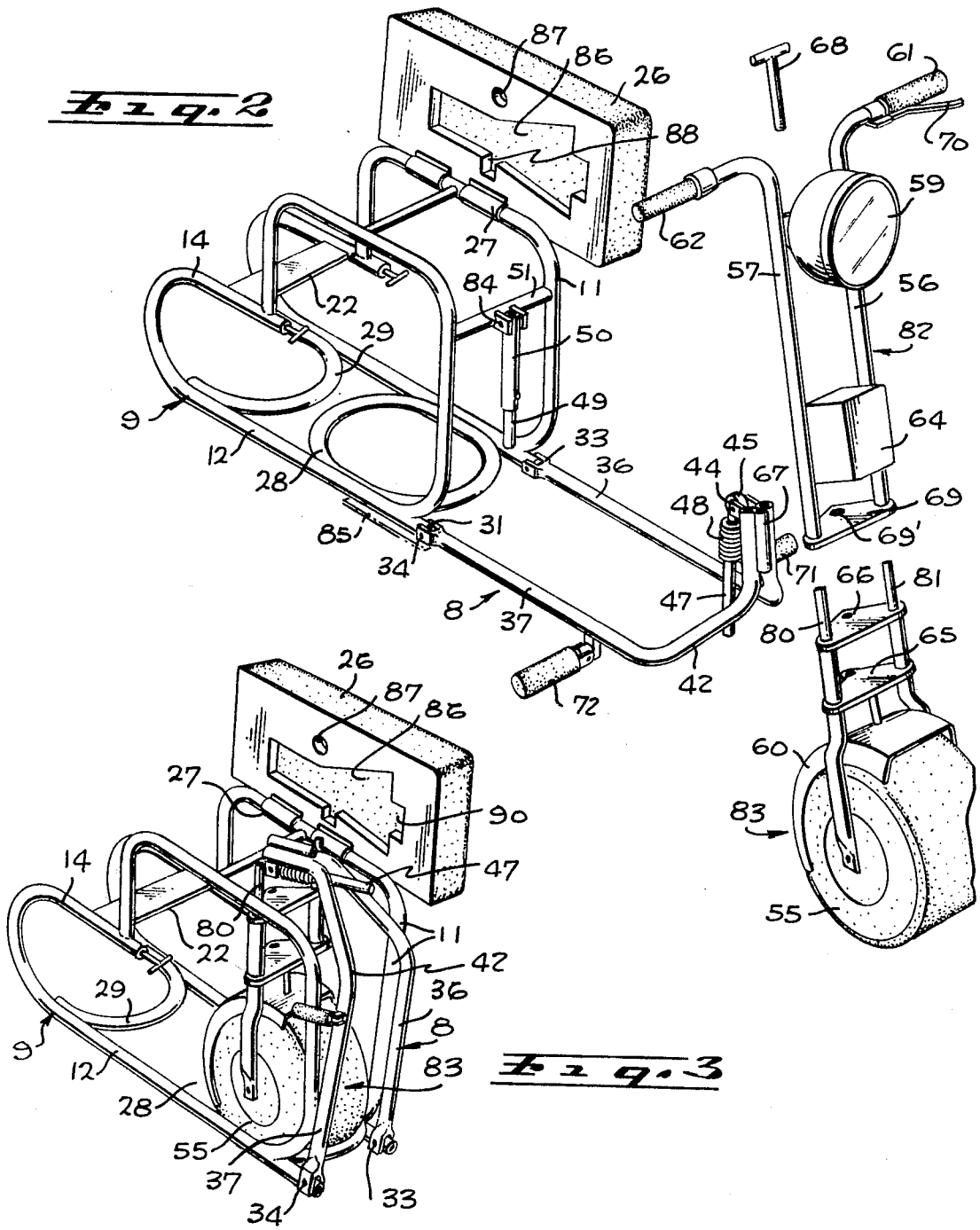

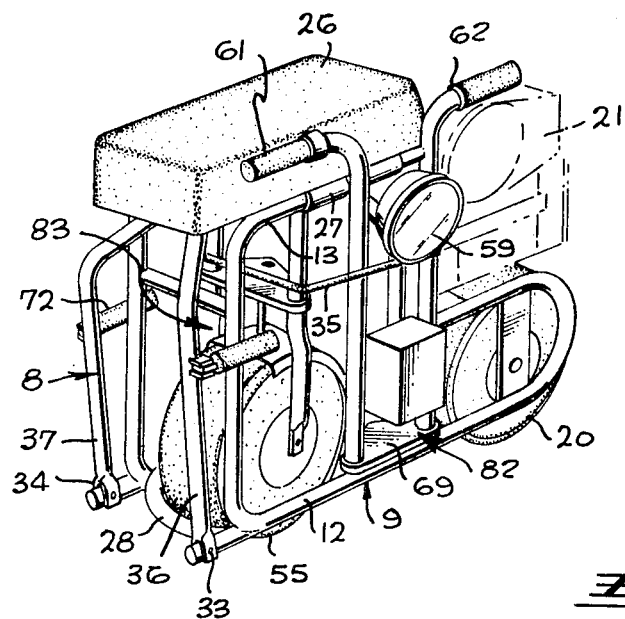
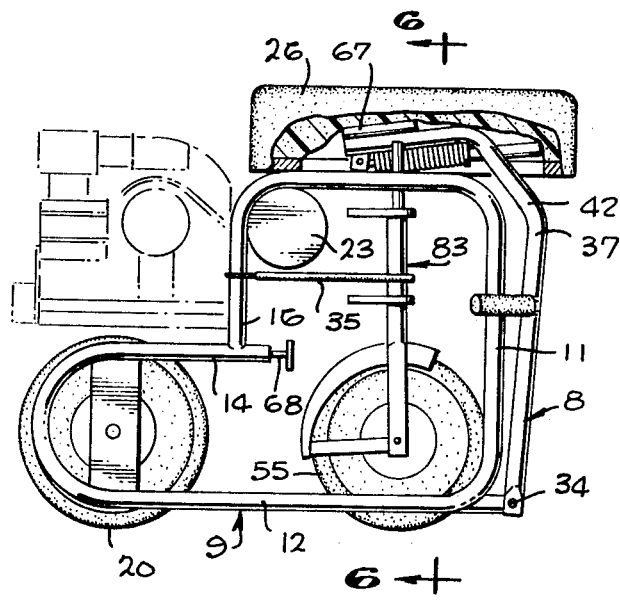
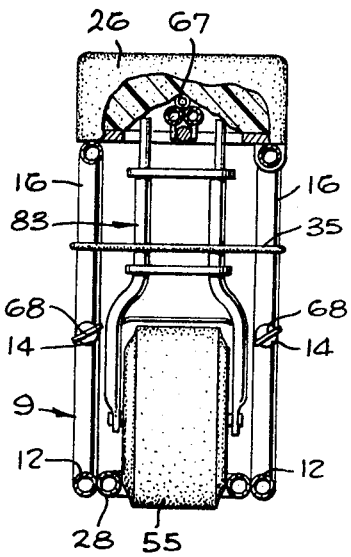

United States Patent Office 3,513,926
Patented May 26, 1970

3,513,926
TWO-WHEELED FOLDABLE PERSONNEL TRANSPORTER
Richard E. Paget, Jr., deceased, late of Los Angeles, Calif., by Odette Y. Paget, surviving spouse, Los Angeles, Calif. (5132 White Oak Ave., Encino, Calif. 91316)
Filed Jan. 23, 1968, Ser. No. 702,499
Int. Cl. B62k *15/00*
U.S. Cl. 180—32                                12 Claims

ABSTRACT OF THE DISCLOSURE

The personnel transporter disclosed herein provides a foldable tubular frame having a forward portion and a rear portion pivotally connected together. A seat and an engine is mounted on supporting structure carried by the rear portion as well as a rear wheel of the vehicle which is powered by the engine via a drive train. The forward portion detachably supports a front wheel and a steering mechanism. A resilient shock tube is detachably connected between the forward and rear frame portions which maintains the frame in a substantially rigid condition. One end of the shock tube is coupled to the steering mechanism by a trunion bearing adapted to allow the frame to flex in all directions so as to accommodate twisting moments as well as to flex at the frame pivot connections.

BACKGROUND OF THE INVENTION

Field of the invention

This invention relates to personnel transportation vehicles of the bi-wheeled variety and, more particularly, to a novel personnel transporter adapted to be selectively folded into either a roadable configuration or a storage configuration and which, in its roadable configuration, is adapted to withstand extensive abuse while in use without suffering adverse effects of parts breakage, metal fatigue or undue strain on the vehicle's structure.

Description of the prior art

Conventional bi-wheeled vehicles have been employed extensively in the past for transporting one or two individuals from one location to another. Usually, such vehicles take the form of motorcycles or motor scooters which are designed and constructed for specific riding purposes. For example, these vehicles are generally placed in predetermined classifications for use in connection with sports activities, competition, trail riding, cross-country travel, etc. and usually are designed to meet and satisfy the particular needs and requirements for the predetermined classification according to such use. Therefore, no one vehicle designed for a particular classification will satisfy or have the specifications or design characteristics necessary to serve multiple purposes effectively.

Due to the awkwardness and cumbersome construction of conventional bi-wheel vehicles for use in the variety of classifications mentioned above, it is difficult to convert or modify such vehicles so that they may be readily folded or collapsed into a storage configuration. Attempts have been made to provide this feature in conventional bi-wheel vehicles by cutting the main frame of the vehicle and incorporating hinge connections between the severed portions of the frame so that at least the overall size of the vehicle can be reduced by folding the frame portions about the hinge connections. However, many difficulties have been encountered when employing such an obvious folding frame which reside in the fact that the frame is severely weakened in strength, and proper load and stress transmission through the frame cannot be readily achieved.

Inasmuch as the frame of the vehicle is the most important load bearing structure of the vehicle, the design construction thereof, composition of material and attachment points thereto for the wheels, engine, seat and steering mechanism, are of great importance in the original lay-out of the frame. Once the frame has been severed to accommodate the incorporation of hinge connections, the entire balance and load bearing capabilities of the frame are degradated. As an example of this problem, motor scooters mount the engine for the vehicle so that the thrust axis is off-set with respect to the center axis of the vehicle. The engine mounted in this fashion not only wastes power but requires the frame construction to take this off-set engine mounting into account when designed and fabricated so as to properly distribute load forces.

Even though these prior attempts to collapse or fold bi-wheel vehicles have been partially successful, the overall dimension and storage volume of the folded or collapsed vehicle is excessively large. For example, a foldable bi-wheeled vehicle formed from any conventional motorcycle or motor scooter is not suited for storage in the limited area of baggage compartments provided in small private aircraft, boats or automobiles because of the relatively small available storage volume in such compartments. Also, the weight of the conventional motorcycle or motor scooter prohibits the folded vehicle from being carried by the rider with one hand. Therefore, storage volume area and weight are important considerations in the provision of a foldable personnel transporter.

SUMMARY OF THE INVENTION

Accordingly, the foldable personnel transporter of the present invention obviates the problems and difficulties encountered with conventional bi-wheeled vehicles by providing a bi-wheeled construction which is specially designed to be of small volume in its collapsible or folded condition and light of weight as well as to have the capacity to transport one or two persons about the streets and highways in its roadable configuration. The personnel transporter includes a tubular frame having a forward portion which is pivotally connected to a rear portion on which the seat and engine are fixedly mounted as well as the rear wheel of the vehicle. The forward portion includes a detachable mechanism for connecting the front wheel and the steering mechanism thereon. The thrust line of the vehicle's engine is on the center line of the vehicle. A resilient shock tube is detachably connected between the forward and rear frame portions which maintains the frame in a rigid condition in its roadable configuration. Means are included in the shock tube for detachably connecting the shock tube so that the front portion of the frame may be pivoted into nesting relationship with the rear portion to fold the vehicle for storage. The rear portion further includes frame means for storing the front wheel and the steering assembly after disconnection with the forward portion of the frame so that the entire vehicle is folded and assembled into a unitary construction for storage purposes.

The personnel transporter further includes a trunnion bearing for coupling one end of the shock tube to the forward portion of the frame which allows the vehicle to flex in all directions wherein the load forces generated during use of the vehicle will be properly distributed to load absorbing parts of the vehicle frame. To complete the vehicle, a sealed beam headlight is employed and a six-volt lantern battery is included as well as a tail light and a stop light. Means are provided for selectively switching the electrical circuits for the lights so as to operate from the brake mechanism to energize the stop light during braking procedures.

Therefore, it is among the primary objects of the present invention to provide a novel personnel transporter of the bi-wheeled variety incorporating a pair of frame portions which are pivotally connected so as to fold for storage purposes wherein the forward portion will nest with the rear portion to provide a compact arrangement of minimum volume area.

Another object of the present invention is to provide a foldable personnel transporter adapted to transmit generated load forces during the use thereof into shock absorbing portions of the vehicle frame so that the vehicle may be employed for rugged operation on the roads.

Another object of the present invention is to provide a novel personnel transporter wherein the thrust axis of the engine lies on the central axis of the vehicle so that maximum advantage is obtained from the horsepower of the engine to drive the vehicle.

Another object of the present invention is to provide a novel personnel transporter of the bi-wheeled variety having a frame consisting of a forward portion and a rear portion which are not only hingeably connected together but which includes a detachable shock tube movably mounted between the front and rear portions that will permit the frame to twist during normal usage of the transporter on the roads.

Still another object of the present invention is to provide a collapsible and foldable personnel transporter that can be of minimum weight and storage volume adapted to be carried by one hand of the user and stored within the confines of a conventional vehicle storage compartment.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a perspective view of the novel foldable personnel transporter of the present invention illustrated in its unfolded and roadable configuration;

FIG. 2 is an exploded perspective view of the transporter shown in FIG. 1 illustrating partial disassembly of the front wheel and handlebar assembly preparatory to being folded;

FIG. 3 is a perspective view of the transporter illustrating the folded frame adapted to receive the removable front wheel and handlebar assemblies in preparation for conversion to its storage configuration;

FIG. 4 is a perspective view of the transporter in its folded configuration for storage or carrying;

FIG. 5 is a side elevational view, partly in section, of the transporter illustrated in its folded configuration as taken from the opposite side of that shown in FIG. 4;

FIG. 6 is a transverse cross-sectional view of the folded transporter as taken in the direction of arrows 6—6 of FIG. 5;

FIG. 7 is an enlarged fragmentary elevational view of the removable joining means for detachably coupling the frame front portion to the front wheel assembly as taken in the direction of arrows 7—7 of FIG. 6; and FIG. 8 is a fragmentary sectional view of the transporter shown in FIG. 1 as taken in the direction of arrows 8—8 thereof.

DESCRIPTION OF THE PREFERRED EMBODIMENTS

Referring to FIG. 1, a novel foldable personnel transporter of the present invention is illustrated in the general direction of arrow 10 which includes a frame comprising a front portion 8 and a rear portion 9. The rear portion includes a pair of tubular frame members arranged in vertical parallel spaced apart relationship. Each member includes a vertical section 11, a base section 12, a seat supporting section 13 and an engine support section 14. The end of base section 12 is continuous with one end of the engine support section 14 by means of a curved section 15 while the opposite end of the engine supporting section 14 is secured to the end of an intermediate section 16 forming a part of one end of the seat section 13. A pair of brackets 17 are fixedly secured between the sections 14 and 12 so as to rotatably mount an axle on which a rear wheel 20 is disposed. An engine 21 is secured to a platform 22 which extends between the support sections 14 of the frame members. Therefore, it can be seen that the thrust axis of the engine 21 lies on the central axis of the frame and of the wheel 20.

Although not shown, the drive shaft of the engine is coupled to the axle 18 by means of a chain and sprocket arrangement so that the rear wheel 20 is controllably driven by the engine 21. Fuel for the engine 21 is suitably supplied from a fuel storage tank 23 that is suitably secured beneath the seat support section 13 adjacent the intermediate section 16 of each frame member. The engine may be employed to mount a suitable stop light assembly 24 as well as a holder for displaying a license plate 25.

A seat 26 is composed of suitable cushion material and is substantially hollow underneath. The seat 26 is carried on the seat supporting section 13 of the frame members when the vehicle is in its roadable configuration. However, when the vehicle is being folded, the seat 26 pivots about a pair of hinges 27 rotatably mounted on support section 13 of one of the frame members.

To rigidize the frame construction, an oblong tubular member 28 and a semi-circular tubular member 29 are suitably welded between the base members 12 of the frame members forward of the rear wheel 20. In addition to rigidizing the frame, the oblong member 28 serves as a receptacle for holding the front wheel when the vehicle is in its folded configuration.

To complete the frame rear portion 9, a pair of tubular stubs 30 and 31 are provided on the respective frame members by welding to the base sections 12 so as to forwardly project beyond the vertical sections 11 of each frame member. The forward portion 8 of the frame is pivotally secured to the terminating ends of the stubs 30 and 31 by means of pivotal connections 33 and 34. A spring bungee 35 is provided which is detachably connected to the intermediate sections 16 and which is employed to hold certain portions of the vehicle together when it is in its stored condition.

The front frame portion 8 comprises a pair of yoke tubes 36 and 37, each of which include two compound bends that are joined together on the central axis of the vehicle. The tubes include the compound bends for inherent strength and are in the proper configuration to allow the forward portion to be folded and nested under the seat 26. Each tube includes an elongated base section having one end thereof pivotally connected to each of the respective stubs 30 and 31 by the pivot connections 33 and 34. The opposite end of each tube is bent at curvature 41 into an intermediate segment 42 which terminates in a vertical section 43. The vertical sections 43 of each tube are joined together such as by welding and include a bracket 44 for mounting a trunnion bearing 45. The trunnion bearing 45 is coupled to one end of a shock tube 46 which comprises a tubular section 47 operably arranged to carry a spring 48 and a section 50 which is pivotally connected on its opposite end to a support bar 51 fixedly secured between vertical sections 11 on the frame members of the rear frame portion 9. The shock tube is so disposed as to telescope inwardly or outwardly depending upon the loads placed on the frame against the tension of the spring 48. The shock tube is detachably connected between sections 47 and 50 by means of a releasable pin 52. When the pin is inserted in registered apertures between a rod 49 carried on tube section 50 and formed through the wall of tube 47, the shock tube is rigidly disposed between the front and the rear portions of the frame. However, when the pin is removed, the shock tube is separated into its respective parts with section 47 pivoting about the trunnion 45 on bracket 44 and the tube section 50 pivoted on its bracket carried on the support bar 51.

Referring further to FIG. 1, a front wheel 5 is provided which is rotatably carried between a pair or substantially upright parallel tubular members 56 and 57. The ends of the tubular members are preferably flattened so as to receive and mount a suitable axle 58 which rotatably mounts the wheel to the transporter. A suitable fender 60 is mounted between the tubular members 56 and 57 so as to cover the tread portion of wheel 55 in order to protect the rider from any flying debris that may be picked up by the rotating wheel 55. The opposite ends of the tubular members 56 and 57 from their respective ends mounting wheel 55 are formed to provide handlebars 61 and 62 over which hand grips may be placed for receiving the rider's hands. A crossbar 63 is provided to rigidize the front wheel assembly and to mount alight 59 of the sealed beam type. Its opposite ends are suitably welded to the parallel tubular members 56 and 57. The illumination means 59 may be readily mounted on the front side of the wheel assembly and may include the necessary wiring leading rearwardly to a generator (not shown) carried on the rear frame portion 9 and adapted to be selectively operated from the sprocket driving means. However, storage batteries may be employed that may be contained within box 64.

The front wheel assembly is mounted to the forward frame portion 8 by means of crown plates 65, 66 and 69 which are secured in fixed spaced parallel relationship on the respective tubular members 56 and 57 so as to define a space or gap between plates 65 and 66. Each of the crown plates includes a rearwardly extending portion having an aperture 69' therein in alignment with each other. The apertures on the crown plates are adapted to be registered with the central bore of a sleeve 67 disposed between plates 65 and 66 so that a coupling bolt 68 may be placed therethrough to detachably retain the front wheel assembly onto the forward frame portion 8 of the transporter. Preferably, the distance between the crown plates 65 and 66 is substantially equal to the length of the tubular segments 43 formed in the tubular members 36 and 37 of the front frame portion 8. The tubular members 56 and 57 of the front wheel assembly are separable into individual parts and will be described later so as to permit rapid assembly and disassembly of the transporter so that a variety of configurations may be assumed.

In order to apply brakes to the vehicle, a hand brake system may be employed utilizing a lever 70 that may be readily operated by a single hand of the rider. Suitable mechanism may couple the lever 70 to a shoe type brake mechanism (not shown) carried on the rear frame portion adjacent the rear wheel 20. Furthermore, in order that the rider may support his feet and legs, a pair of outwardly extending footrests 71 and 72 are provided that are pivotally carried on the outside of the tubular members 36 and 37 of the front frame portion 8.

Referring now to FIG. 2, the transporter vehicle of the present invention is illustrated partially disassembled in preparation for folding to its storage configuration. It is to be noted that the front wheel assembly is disconnected from the forward frame portion 8 by removal of bolt 68 from sleeve 67 which permits crown plates 66 and 69 to become separated. The tubular members 56 and 57 are detachably connected by means of a pair of rods 80 and 81 which project upwardly from the upper surface of crown plate 66 and which are adapted to be slidably arranged within the bore of the upper portions of tubular members 56 and 57. Therefore, not only is the front wheel assembly detached from the front frame portion 8 but the front wheel assembly is sub-divided into the handlebar portion indicated by arrow 82 and the front wheel portion indicated in the direction of arrow 83.

It is also to be noted in FIG. 2 that the shock tube 46 is detached so that tubular member 50 downwardly depends from its pivotal connection with a bracket 84 secured on support rod 51. When so detached, the rod 49 carried on the end of tubular member 50 is exposed. The tubular portion 47 of the shock tube 46 is downwardly depending from trunnion 45 on its pivotal connection to the bracket 44 secured to the sections 43. A kick-stand 85 is rotatably secured on the underside of stud 31 which may be employed to support the vehicle in either its stored or unfolded configuration.

The seat 26 is formed with a central recess 86 adapted to receive various portions of the vehicle frame and assemblies during storage. The seat is further formed with smaller recesses 87 and 88 adapted to be registered with the rods 80 and 81 when the wheel portion 83 is stored in the well or confines of the oblong support member 28.

Referring now to FIG. 3, the transporter is substantially assembled into its folded configuration wherein the front frame portion 8 is pivoted about pivot connections 33 and 34 so that the elongated tubular members or sections 36 and 37 thereof lie in close proximity to the vertical tubular sections 11 of the respective frame members comprising the rear frame portion 9. The intermediate sections 42 and sections 44 of the front frame portion are disposed immediately below the seat 26 so that when the seat is pivoted on hinges 27, these latter frame sections will occupy the recess 86 formed in the seat. The front wheel portion 83 is illustrated wherein the front wheel 55 resides within the oblong member 28 and the rods 80 and 81 are in alignment to occupy the recesses 87 and 88, respectively. A forward recess 90 is formed in the underside of the seat 26 as part of the recess 86 in order to accommodate the disposition of tube 47 therein when the front frame portion is folded.

Referring now to FIGS. 4, 5 and 6, a completely folded vehicle is illustrated and assembled in its storage configuration. Once the forward frame portion 8 has been folded and the wheel portion 83 mounted between the frame members of the rear frame portion 9 as shown in FIG. 3, the seat 26 is pivoted on its hinges 27 so as to rest on the seat support sections 13. The forward frame portion and the wheel portion 83 are held in place by the aforementioned portions of the assemblies which occupy the respective recesses 86–88 and 90, inclusive. The footrests 71 and 72 are pivoted rearwardly so as to extend adjacent the frame section 11 of each frame member on the rear frame portion. The steering assembly 82 is placed so that crown plate 69 rests on section 12 of one of the frame members while the handlebar grips reside adjacent the seat and engine, respectively. The spring bungee 35 retains the steering assembly on the folded frame so that a compact configuration results suitable for storage in the luggage compartment of an automobile or aircraft. Connection bolt 68 may be stored in a threaded receptacle provided in the terminating end of tube section 14.

Referring now in detail to FIG. 7, it can be seen that the front frame portion 8 is secured to the wheel assembly by means of bolt 68. The sleeve 67 is removably positioned between the crown plates 66 and 65 so that the bore of the sleeve is in registry with the apertures formed through the crown plates so that the shank of bolt 68 may extend therethrough. The terminating end of bolt 68 is threaded in order to receive a retaining nut 91. Preferably, the nut 91 is permanently attached to the underside of crown plate 65 such as by welding, for example, so that connection is made by threadably engaging the shank of the bolt 68 therewith. Furthermore, it can be seen that one end of expansion spring 48 butts against a plate 92 carried on a rod 93 which is coupled to the trunion bearing 45 on one end and the tube 47 on its opposite end. The spring is compressed between the end of tube 47 and the plate 92. However, it is to be understood that the rod 93 may move within the tube 47 so as to permit the spring to absorb shocks communicated thereto through the vehicle frame. A stop nut 94 is threadably mounted on the rod 93 and may be employed for adjusting the tension of the spring 48 by setting the position of the plate 92.

It can also be seen that the front wheel rods, as represented by rod 81, are slidably received inside the bore of tubular members 56 and 57 when the front wheel portion 83 is mounted to the handlebar or steering portion 82.

The relationship between the opposite ends of spring 48 and the plate 92 with respect to the end of tube 47 is more clearly shown in FIG. 8. Also, it can be seen that as the spring 48 is compressed, the front frame portion 8 will pivot about connections 33 and 34. Therefore, the shock tube 46 will expand or contract depending upon the load forces being transmitted through the entire vehicle frame.

Therefore, it can be seen that the shock tube 46 effectively holds the front frame portion and rear frame portions together and that by employing the trunnion bearing 45, the vehicle is allowed to flex in all directions. The vehicle is permitted to twist as well as to flex at the hinge points and this flexure eliminates any frame cracking. The trunnion bearing may rotate 30° each side of center in a lateral position with 180° in the vertical position.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A foldable bi-wheel vehicle comprising:
    a main frame having a front frame portion and a rear frame portion pivotally connected together in end-to-end relationship;
    a front wheel and steering assemblage detachably carried on the free end of said front frame portion;
    a rear wheel and power means operably coupled thereto carried on said rear frame portion; and
    an expandable resilient means interconnecting the free end of said front frame portion with said rear frame portion adapted to absorb shocks encountered by said main frame during use of the vehicle;
    said resilient means comprising a pair of coextensive elongated members detachably joined at their adjacent ends and pivotally connected at their opposite ends to said front and rear frame portions respectively and further including a shock absorber operably carried on a selected one of said coextensive members.

2. A foldable bi-wheel vehicle comprising:
    a main frame having a front frame portion and a rear frame portion pivotally connected together in end-to-end relationship;
    a front wheel and steering assemblage detachably carried on the free end of said front frame portion;
    a rear wheel and power means operably coupled thereto carried on said rear frame portion;
    an expandable resilient means interconnecting the free end of said front frame portion with said rear frame portion adapted to absorb shocks encountered by said main frame during use of the vehicle; and
    said resilient means including a pair of coextensive tubular members detachably joined at their adjacent ends and pivotally connected at their opposite ends to said front frame portion and said rear frame portion respectively.

3. The invention as defined in claim 2 wherein said resilient means further includes an elongated coil spring operably disposed on a selected one of said pair of coextensive tubular members so as to expand and contract in response to applied loads generated in said front and rear frame portions.

4. The invention as defined in claim 2 wherein said pivotal connection of said coextensive tubular members to said front frame portion comprises a trunion bearing adapted to accommodate lateral and vertical displacements.

5. The invention as defined in claim 4 including a releasable pin adapted to detachably connect the adjacent ends of said pair of coextensive tubular members together.

6. The invention as defined in claim 2 wherein said front wheel and steering assemblage includes:
    a pair of spaced apart crown plates, each being formed with coaxial apertures;
    a hollow sleeve fixedly carried on the free end of said front frame portion adapted to fit between said pair of crown plates so as to be registered with each of said apertures; and
    a bolt means adapted to extend through said registered apertures and said sleeve to detachably couple said front frame portion to said front wheel and steering assemblage.

7. The invention as defined in claim 2 wherein said power means is mounted on said rear frame portion so that the thrust axis of said power means lies on the central longitudinal axis of said main frame.

8. A foldable bi-wheel vehicle comprising:
    a main frame having a front frame portion and a rear frame portion pivotally connected together in end-to-end relationship;
    a front wheel and steering assemblage detachably carried on the free end of said front frame portion;
    a rear wheel and power means operably coupled thereto carried on said rear frame portion;
    an expandable resilient means interconnecting the free end of said front frame portion with said rear frame portion adapted to absorb shocks encountered by said main frame during use of the vehicle;
    said front wheel and steering assemblage including:
    a pair of spaced apart crown plates, each being formed with coaxial apertures;
    a hollow sleeve fixedly carried on the free end of said front frame portion adapted to fit between said pair of crown plates so as to be registered with each of said apertures;
    a bolt means adapted to extend through said registered apertures and said sleeve to detachably couple said front frame portion to said front wheel and steering assemblage; and
    a handlebar portion having a pair of spaced tubular sections and a wheel portion having a pair of rods adapted to be insertably received into the terminating ends of said tubular sections.

9. The invention as defined in claim 8 wherein said resilient means includes a pair of coextensive tubular members detachably joined at their adjacent ends and pivotally connected at their opposite ends to said front frame portion and said rear frame portion respectively.

10. The invention as defined in claim 8 including:
    a third crown plate secured between the terminating ends of said tubular sections and being formed with an aperture coaxial with said apertures of said first mentioned pair of crown plates; and wherein
    said first mentioned pair of crown plates are secured in fixed spaced apart relationship between said pair of rods and arranged so that a length of each of said rods projects upwardly in parallel relationship from the topmost one of said pair of crown plates; and wherein
    said bolt means is adapted to releasably connect said wheel portion to said handlebar portion.

11. The invention as defined in claim 10 including a cushioned seat pivotally carried on said rear frame portion and being formed with recesses on the underside thereof adapted to receive said pair of rods when said wheel portion is disassembled and stored on said rear frame portion beneath said seat and further adapted to receive the free end of said front frame portion when said front frame portion is pivoted on said rear frame portion.

12. The invention as defined in claim 11 wherein said rear frame portion includes a pair of tubular frame members arranged in fixed spaced parallel relationship with respect to each other;
cross bars extending between said pair of frame members securing said frame members together;
an oblong tubular support secured between said frame members adjacent their ends adapted to receive and support said wheel portion for storage thereof; and wherein
said front frame portion includes a pair of tubular sections formed with compound bends constituting a yoke wherein the ends of each of said tubular sections are pivotally connected to said rear frame portion and the other ends of each of said tubular sections are secured together in a junction with said sleeve.

References Cited
UNITED STATES PATENTS

| | | | |
|---|---|---|---|
| 424,870 | 5/1890 | Fay | 280—275 X |
| 687,216 | 11/1901 | Foreman | 280—283 |
| 2,910,130 | 10/1959 | Schlaphoff | 280—287 X |
| 3,042,132 | 7/1962 | Bouffort | 280—278 X |
| 3,212,791 | 10/1965 | Edwins | 280—279 X |
| 3,295,863 | 1/1967 | Jaulmes | 280—278 |
| 3,354,975 | 11/1967 | Stuart | 280—278 X |

KENNETH H. BETTS, Primary Examiner

U.S. Cl. X.R.

280—279, 287